United States Patent

Choi et al.

Patent Number: 5,532,334
Date of Patent: Jul. 2, 1996

[54] PROCESS FOR PREPARING POLYAMIDEIMIDE RESINS HAVING HIGH MOLECULAR WEIGHT

[75] Inventors: Kil-Yeong Choi; Dong-Hack Suh; Mi-Hie Yi; Young-Taik Hong; Jong-Chan Won, all of Daejeon, Rep. of Korea

[73] Assignee: Korea Research Institute of Chemical Technology, Daejeon, Rep. of Korea

[21] Appl. No.: 339,391

[22] Filed: Nov. 14, 1994

[30] Foreign Application Priority Data

Nov. 12, 1993 [KR] Rep. of Korea ............ 1993-24151

[51] Int. Cl.$^6$ .................. C08G 73/14; C08G 69/26
[52] U.S. Cl. .................. 528/350; 528/170; 528/172; 528/173; 528/182; 528/183; 528/220; 528/229; 528/310; 528/322; 528/328; 528/348; 528/351; 528/353; 525/420; 525/424; 525/425; 525/434
[58] Field of Search .................. 528/348, 350, 528/310, 351, 322, 353, 328, 220, 229, 170, 182, 172, 183, 173; 525/420, 424, 425, 434

[56] References Cited

U.S. PATENT DOCUMENTS

| | | | |
|---|---|---|---|
| 3,541,038 | 11/1970 | Nakano et al. | 524/726 |
| 3,860,559 | 1/1975 | Minami et al. | 528/182 |
| 3,920,612 | 11/1975 | Stephens | 528/350 |
| 4,045,407 | 8/1977 | Keske et al. | 528/182 |
| 4,118,374 | 10/1978 | Yamazaki et al. | 528/337 |
| 4,448,957 | 5/1984 | Nagaoka | 528/351 |
| 4,814,417 | 3/1989 | Sugimori | 528/182 |
| 5,047,499 | 9/1991 | Sakata et al. | 528/313 |

FOREIGN PATENT DOCUMENTS

| | | |
|---|---|---|
| 58-180532 | 10/1983 | Japan. |
| 62-297329 | 12/1987 | Japan. |
| 2-18422 | 1/1990 | Japan. |

Primary Examiner—Jeffrey Mullis
Assistant Examiner—P. Hampton-Hightower
Attorney, Agent, or Firm—Ladas & Parry

[57] ABSTRACT

A process for preparing polyamideimide resins having high molecular weights as described wherein major problems of prior art processes such as low heat resistance and low melt flowability are improved. Polyamideimide resins having an intrinsic viscosity of 0.4 to 1.50 dl/g as measured on a solution of dimethylacetamide as a solvent at a concentration of 0.5 g/dl at 30° C., are prepared by reacting an aromatic tricarboxylic acid anhydride with an aromatic diamine in N-methyl pyrrolidone solvent in the presence of a first catalyst selected from a group consisting of thionyl chloride, p-toluenesulphonly chloride, sulfuryl chloride, cyanuric chloride and phosphorus trichloride at a temperature of 50° C. to 130° C. over a period of 1 to 5 hours and further reacting the resultant reaction mixture in the presence of a second catalyst which is a compound of the formula $(RO)_3P$ wherein R is an aliphatic or aromatic substituent, or a compound which is phosphoric acid, pyrophosphoric acid, phosphorous pentaoxide or phosphorous pentachloride as a second catalyst at a temperature of 50° C. to 130° C. over a period of 1 to 5 hours.

8 Claims, No Drawings

PROCESS FOR PREPARING POLYAMIDEIMIDE RESINS HAVING HIGH MOLECULAR WEIGHT

FIELD OF THE INVENTION

The present invention relates to a process for preparing polyamideimide resins, which is economically interesting. More specifically, it relates to a process for preparing polyamideimide resins by dissolving an aromatic tricarboxylic acid anhydride (or its derivative) and an aromatic diamine in a polar solvent and directly polymerizing the solution in the presence of polymerization catalyst.

The present invention also relates to a process for preparing polyamideimide resins having high molecular weights in a high yield and in a simple manner at a relatively low temperature for a short time.

BACKGROUND OF THE INVENTION

The molecular structures of the polyamideimide resins vary depending on the monomers employed. But typical examples thereof are those represented by the following formula (I)

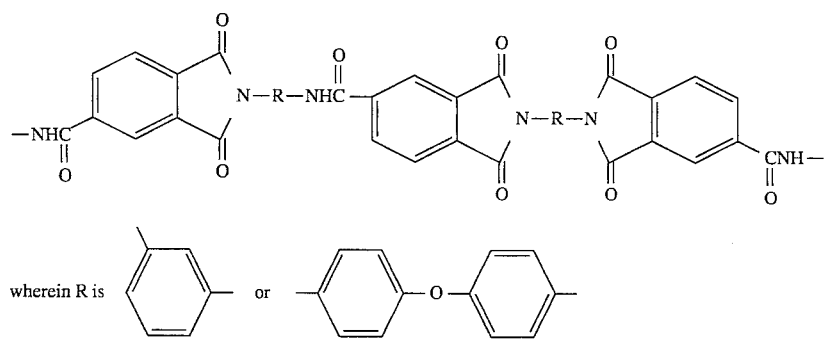

prepared by polycondensation of trimellitic acid (or its derivatives) as an aromatic tricarboxylic acid component with m-phenylene diamine and diaminodiphenyl ether as an aromatic distains component.

Polyamideimide resins of the formula (I) are disclosed in U.S. Pat. No. 4,045,407 and Japanese Patent Publication HEI 02-18,422. They are transparent and noncrystalline resins which have the following properties:

(1) They have a heat distortion temperature of 278° C. and a long term heat resistance temperature exceeding 200° C. They have excellent heat resistance. They are usable in the broad temperature range of −200° C. to 260° C.;

(2) They not only have high mechanical strength but also good stiffness providing physical property at room temperature of general engineering plastics even at temperatures exceeding 200° C. They also have excellent impact resistance.

(3) They also have creep resistance;

(4) They have a small linear expansion coefficient of $4 \times 10^{-5}$ cm/cm.°C., which can be reduced to less than half by using filler.

(5) They have excellent insulation breakdown strength and volume resistivity, and show flame retardance of UL 94 V-O without adding additives.

(6) They have good wear resistance property due to their composition of PTFE and graphite. They are suitable as sliding member under severe circumstance since they have good self-lubricating properties, wear resistance and strength and elasticity even at high temperature.

(7) They have good chemical resistance and are stable in hydrocarbon solvents, through care must be taken in concentrated aqueous alkali solution.

(8) They have good ultraviolet resistance and radiation resistance.

Examples of the methods for preparing a polyamideimide resins generally include the isocyanate method and acid chloride method.

The isocyanate method comprises condensating aromatic diisocyanate with aromatic tricarboxylic acid anhydride to give polyamideimide without through polyamic acid which is intermediate polymer as disclosed in Japanese Patent Laid-Open Publication No. SHO 48-19274 and U.S. Pat. No. 3,541,038(1970).

The acid chloride method comprises the condensation of aromatic tricarboxylic acid chloride with aromatic diamine. This method is classified into "low temperature homogeneous solution polymerization method" and "low temperature precipitating polymerization method". The typical example of the low temperature homogeneous solution polymerization method comprises the polymerization reaction at room temperature in nonaqueous type polar solvent such as N,N-dimethylacetamide (hereinafter referred to as DMAC) which was developed by Standard-Oil-Co., in the U.S.A. as disclosed in U.S. Pat. No. 3,920,612 (1975). The typical example of the low temperature precipitating polymerization method comprises the polymerization reaction in an organic solvent which is sparingly soluble in water, such as methyl ethyl ketone (for example, produced by Teijin Kasei Corp. in Japan) and in an aqueous solvent by using triethylamine as an acid acceptor as disclosed in Japanese Patent Laid-Open No. SHO 46-15,513. This reaction is a sort of interface polymerization method.

Another method of preparing polyamideimide resin is the direct polymerization method which comprises direct polymerization of aromatic diamine with aromatic tricarboxylic acid in the presence of dehydration catalyst as disclosed in U.S. Pat. No. 3,860,559 (1975) and Japanese Patent Publication No. SHO 58-180532.

However, the isocyanate method has problems in that gelation occurs during the reaction and it is difficult to give linear polymers having high molecular weights due to the formation of side reaction products. Therefore, the polyamideimide resins prepared by the method have decreased melt flowability, poor mold processability, mechanical properties and heat resistance, and thus are not suitable for application as molding materials.

By the low temperature homogeneous solution polymerization method, polymers having high molecular weights can be obtained by using very expensive acid chloride as raw materials. However, this makes the cost for raw material very high. Furthermore, since this method is carried out in two steps consisting of preparing polyamic acid as a primary polymer and then imidization of the latter by heating or by using dehydration catalyst and it is required to remove halogen compound which is formed during the reaction, the method is economically less interesting. This method also has a problem in that the modification of the molecular structure of the resins is almost impossible.

The low temperature precipitating polymerization method is carried out in two steps as low temperature homogeneous polymerization method, which consists of precipitating polyamic acid by using very expensive acid chloride and using methyl ethyl ketone and water as a reaction solvent and subsequently subjecting it to ring closing treatment. The polyamideimide resins prepared by the two steps have a large molecular weight distribution and low molecular weights. Thus, the method has no practical use.

Both the isocyanate method and acid chloride method have disadvantages in that the handling of acid chloride and diisocyanate is troublesome since both acid chloride and diisocyanate are sensitive to water, which should be blocked in the reaction process.

Meanwhile, the direct polymerization method of polyamideimide resins comprises directly polymerizing the aromatic diamine with aromatic tricarboxylic acid anhydride (or its derivatives) in the presence of polymerization catalyst. The advantages of this polymerization method are that the process of this method is simplest among many preparing processes, the cost for raw materials and processing is not high, and that the handling of monomers is easy. For these reasons active researches have been made in this field. The examples of polymerization catalyst used in the method are phosphoric acid types such as phosphoric acid and polyphosphoric acid (Japanese Patent Publication Nos. SHO 63-27,527 and SHO 62-297,329, boric acid types such as boric acid and boric acid anhydride (French Patent No.1, 515,066 and Japanese Patent Publication No.58,180,532) or triphenyl phosphite and phosphoric triester type (U.S. Pat. No. 3,860,559). The effect of these polymerization catalysts depends on the type of catalyst. However, to obtain polymers having high molecular weights by using costly polymerization catalyst and reactant monomers in a same molar ratio, it is necessary to carry out the reaction at high temperatures of 200° C. or more for a lengthy period. Thus, even if in the case of using a high boiling point solvent such as N-methyl pyrrolidone (hereinafter referred to as NMP), sulfolan and nitrobenzene as a synthesizing solvent, tar-state substance formed by decomposition of monomers and generated resins in reaction vessel and polymerization catalyst used in a large amount are incorporated into the polymer, which cause unsatisfactory color and the decrease of physical properties of polyamideimide. Moreover, this process is disadvantageous in that it is difficult to give linear polymers having high molecular weights due to side reaction and thereby the solubility of polymers is decreased. Particularly, this process has no economical merit since high costly polymerization catalyst has to be used in a large quantity and the recovery of this catalyst is impossible.

Based on the problems of the above-mentioned processes, the present invention have made extensive studies in order to solve the problems of the known direct polymerization method and to find a process for preparing polyamideimide resins having high molecular weights with good heat resistance and melt flowability. As a result, the present inventors have now found that by dissolving an aromatic tricarboxylic acid anhydride (or its derivatives) and an aromatic diamine in polar solvent and subsequently polymerizing the resultant solution in the presence of polymerization catalyst, polyamideimide resins having high molecular weights can be produced. The present invention has been attained on the basis of this finding.

SUMMARY OF THE INVENTION

It is an object of the present invention to provide a process for preparing polyamideimide resins having high molecular weights with good heat resistance and melt flowability.

In an aspect of the present invention, there is provided a process for preparing polyamideimide resins, which comprises dissolving an aromatic tricarboxylic acid and an aromatic diamine in polar solvent, subjecting the resulting solution to synthesizing treatment by using acyl halogenating agent as a first polymerization catalyst to give a polyamideimide resin having low molecular weight and then subjecting the latter to synthesizing treatment by using phosphorus compound as a second polymerization catalyst to give polyamideimide resins having high molecular weights.

Other objects and advantages will be apparent to those who have ordinary skill in the art from the following description.

DETAILED DESCRIPTION OF THE INVENTION

The present invention relates to a process for preparing polyamideimide resins having high molecular weights.

The procedure for preparing polyamideimide resins (hereinafter referred to as PAI resins) having an intrinsic viscosity of 0.4 dL/g or more is as follows: Acyl halogenating agent such as low priced thionyl chloride which is a first polymerization catalyst is dissolved in a polar solvent such as NMP and subsequently the solution is cooled to 5° C. or less to give a complex. To the complex is added an aromatic tricarboxylic acid anhydride at room temperature and stirred at room temperature for 1 hour. After adding aromatic diamine, the mixture is subjected to polymerization reaction at 50° to 130° C. for 5 hours until the PAI resin prepared has intrinsic viscosity of 0.4 dL/g or less as measured on a solution of DMAC at a concentration of 0.5 g/dL at 30° C. The PAI resin is continuously subjected to polymerization reaction in the presence of second catalyst, for example phosphorus compound such as triphenyl phosphite(hereinafter referred to as TPP) in an amount of 50 mole percent or less based on the number of moles used of monomers to give PAI resins having high molecular weights.

The present invention will be explained in detail in the following.

As the aromatic tricarboxylic acid anhydride which can be used in the present invention, trimellitic acid anhydride, tricarboxylic acid anhydride, 1,2,3-benzene tricarboxylic acid anhydride, 1,2,4-, 1,4,5- and 2,3,6-naphthalene tricarboxylic acid anhydride, 3,4,4'-benzophenol tricarboxylic acid anhydride, and 3,4,4'-phenylether tricarboxylic acid anhydride are suitable. Examples of the aromatic tricarboxylic acid derivatives can be an ester compound of trimellitic acid anhydride with alcohol, for example trimellitic acid monoester compounds such as trimellitic acid monomethyl ester and trimellitic acid monoethyl ester.

Examples of the aromatic diamine usable in the present invention are m-phenylenediamine, p-phenylenediamine, 4,4'-diaminodiphenylsulfon, 4,4'-diaminodiphenylmethane, 4,4'-diaminodipheylsulfide, 4-methyl-1,3-diaminobenzene, 4,4'-diaminodiphenylmethane, 3,4'-diaminodiphenylether, 3,3'-dichloro- 4,4'-diaminodiphenylmethane, 3,3'-dimethoxy-4,4'-diaminodiphenylmethane, m-bis(p-aminophenoxy)benzene, p-bis(p-aminophenoxy)benzene or m-xylenediamine.

These compounds may be used as such or in mixtures of two or more, if necessary. Among these, trimellitic acid anhydride, trimellitic acid monomethyl ester, 4,4'-diaminodiphenyl ether, 4,4'-diaminodiphenyl methane, m-phenylenediamine and p-phenylenediamine are advantageous in respect to physical properties of the prepared resin such as heat resistance and melt flowability, and cost.

In the present invention, as the first polymerization catalyst, organic or inorganic acyl halogenating agent, for example, thionyl chloride, p-toluene sulfonyl chloride, sulfuryl chloride, cyanuric chloride and phosphorus trichloride are usable, but thionyl chloride is especially advisable in respect to cost and property.

In the present invention, as the polar solvent which can form a complex with the first catalyst and thus make imidization easy, NMP, N-ethyl pyrrolidone, N-phenyl pyrrolidone, N-phenyl piperidone, N-methyl caprolactam, N,N'-ethylene dipyrrolidone, N-phenyl dipyrrolidone, hexamethyl phosphoramide (hereinafter referred to as HMPA), N-methylalphapyridone, N,N'-dimethylacetamide, dimethylformamide and dimethyl propionamide are usable. Most preferred are NMP, N-methylalphapyridone, and HMPA.

In the present invention, as the second catalyst, phosphorus compound is used. Examples of phosphorus compound are trivalent phosphorus compounds represented by $(RO)_3P$ such as TPP, tricresyl phosphite, tricyclohexyl phosphite, dimethyl m-chlorophenyl phosphite and oxyethyldipyridyl phosphite. Herein R means aliphatic or aromatic substituents, and examples of R are methyl, ethyl, butyl, i-butyl, 2-ethylhexyl, i-octyl, tolyl, nonyl phenyl and diphenylnonyl. Besides, pentavalent phosphorus compounds such as phosphoric acid, pyrophosphoric acid, m-phosphoric acid, phosphorus pentaoxide and phosphorus pentachloride can be used.

The PAI resins according to the present invention can be prepared by using an aromatic tricarboxlic acid anhydride and an aromatic diamine mentioned above in an equimolar amount. The concentration of the reactants is 5 to 30% by weight, and preferably 7 to 30% by weight. When the concentration is less than 5% by weight, the reaction has no economical merit, and when the concentration is above 30% by weight, gelation occurs. The amount of the first polymerization catalyst used is 5 to 80 mole percent, preferably 40 to 60 mole percent, based on number of moles used of monomers. The reaction temperature is selected from the range of 50° C. to 130° C. and the reaction time is in a range of 1 to 5 hours. The amount of second polymerization catalyst used is 1 to 70 mole percent, especially 5 to 50 mole percent, based on the number of moles used of monomers. The reaction temperature is 70 ° C. to 130° C. and the reaction time is about 1 to 5 hours.

The PAI resins prepared by the present invention have an intrinsic viscosity of 0.4 dL/g as measured on DMAC at a concentration of 0.5 g/L at 30° C. This PAI resins have been thoroughly subjected to imidization, and can be used for molding, film and coating as required.

According to the present invention, the process is carried out at a relatively low temperature of 130° C. or less over a very short time less than 5 hours to give PAI resins having high molecular weights with good heat resistance and melt flowability. Moreover, there is no sign of the decrease of solubility due to side reaction and the discoloration or derease of physical properties due to the incorporation of tar substance. These are to ensure that they can be used as thermoplastic molding material, especially as major heat resistant structural material in advanced industries, for example electrical and electronic, and aerospace industries.

The present invention will now be explained in more detail with reference to the following examples, but it is to be understood that the present invention is not restricted thereto and various modifications are possible within the scope of the invention.

EXAMPLE 1

237.8 g (2 mole) of thionyl chloride was dissolved with nitrogen gas being passed slowly through in 2 liter of NMP in a 25 liter reactor equipped with a stirrer, a nitrogen inlet, a temperature regulator and a condenser and then the solution was cooled to 5° C. or less. After 30 minutes, the solution was warmed to room temperature, and maintained at the same temperature for 30 minutes. To the solution were added slowly 384 g(2 mole) of trimellitic acid anhydride and 2 liter of NMP. After stirring at room temperature over 0.5 to 1 hour or so, the mixed solution of 400 g(2 mole) of diaminodiphenyl ether and 204 g(2 mole) of triethylamine in 3 liter of NMP was slowly added over a period of 1 to 2 hours and the solution was subjected to reaction at 70° C. over a period of 3 hours. To the reaction mixture was added 310 g (1 mole, 50 mole percent) of TPP and the reaction was carried out for 3 hours while the internal temperature was increased to 100 ° C. The reaction mixture was subjected to excess methanol in waring blender to precipitate polymer. The precipitated polymer was separated by filtration, washed several times with water and methanol, and then dried in a vacuum drier at 120° C. for 24 hours to give a polymer as a yellow powder. The intrinsic viscosity as measured on a solution of dimethylacetamide at a concentration of 0.5 g/dL at 30° C. was 0.93 dL/g.

The PAI prepared was dissolved in dimethylacetamide so that the solid content was 10 to 15% by weight. The resulting solution was applied onto a glass plate and subjected to curing treatment at 150° C., 250° C. and 300° C. for 1 hour each to give a PAI film.

EXAMPLE 2

The procedure of Example 1 was repeated except that 155 g (5 mole, 25 mole percent) of TPP was added as the second polymerization catalyst and then the reaction was continuously carried out at 100° C. for 3 hours to give a PAI resin. The intrinsic viscosity as measured on a solution of dimethylacetamide at a concentration of 0.5 g/dL at 30° C. was 0.85 dL/g.

EXAMPLE 3

The procedure of Example 1 was repeated except that 77.5 g (0.25 mole, 12.5 mole percent) of TPP was added as the second polymerization catalyst and after the temperature was heated to 100 ° C., the reaction was continuously carried out at 100° C. for 3 hours to give a PAI resin. The intrinsic viscosity as measured on a solution of dimethylacetamide at a concentration of 0.5 g/dL at 30 ° C. was 0.65 dL/g.

EXAMPLE 4

The procedure of Example 1 was repeated except that 388 g (0.125 mole, 6.25 mole percent) of TPP was added as the second polymerization catalyst and after the temperature was heated to 100° C., the reaction was continuously carried out at 100° C. for 3 hours to give a PAI resin. The intrinsic viscosity as measured on a solution of dimethylacetamide at a concentration of 0.5 g/dL at 30° C. was 0.51 dL/g.

EXAMPLE 5

The procedure of Example 1 was repeated except that 216 g (2 mole) of m-phenylene diamine in place of diaminodiphenyl ether and 204 g (2 mole) of triethylamine were dissolved in 3 liter of NMP to give a PAI resin. The intrinsic viscosity as measured on a solution of dimethylacetamide as a solvent at a concentration of 0.5 g/dL at 30° C. was 0.86 dL/g.

EXAMPLE 6

The procedure of Example 1 was repeated except that 396 g (2 mole) of diaminodiphenyl methane in place of diaminodiphenyl ether and 408 g (4 mole) of triethylamine were dissolved in 3 liter of NMP to give a PAI resin. The intrinsic viscosity measured on a solution of dimethylacetamide as a solvent at a concentration of 0.5 g/dL at 30° C. was 0.86 dL/g.

EXAMPLE 7

The procedure of Example 1 was repeated except that 280 g (1.4 mole) of diaminodiphenyl ether and 65 g (0.3 mole) of m-phenylene diamine were dissolved in 3 liter of NMP and added together with 158 g (2 mole) of pyridine to give a PAI resin. The intrinsic viscosity as measured on a solution of dimethylacetamide as a solvent at a concentration of 0.5 g/dL at 30° C. was 1.25 dL/g.

EXAMPLE 8

The procedure of Example 1 was repeated except that 240 g (1.2 mole) of diaminodiphenyl ether and 64.8 g (0.6 mole) of hexamethylene diamine were dissolved in 3 liter of NMP and added together with 158 g (2 mole) of pyridine to give a PAI resin. The intrinsic viscosity as measured on a solution of dimethylacetamide as a solvent at a concentration of 0.5 g/dL at 30° C. was 1.05 dL/g.

COMPARATIVE EXAMPLE 1

237.8 g (2 mole) of thionyl chloride was dissolved in 2 liter of NMP in the same reaction apparatus as Example 1 and the solution was cooled to 0° C. After 30 minutes, the solution was heated to room temperature and maintained at the same temperature for 30 minutes. To the solution were added 384 g (2 mole) of trimellitic acid anhydride and 2 liter of NMP, and then the solution was stirred at room temperature for 1 hour. 400 g (2 mole) of diaminodiphenyl ether and 204 g (2 mole) of triethylamine were dissolved in 3 liter of NMP and the resulting mixed solution was slowly added to the solution already prepared over a period of 1 to 2 hours and the mixture was allowed to react at 70° C. for 3 hours. After heating to 100° C. and reacting over a period of 3 hours without adding TPP, the procedure of Example 1 was followed to give a PAI resin. The intrinsic viscosity as measured on a solution of dimethylacetamide at a concentration of 0.5 g/dL at 30° C. was 0.25 dL/g.

COMPARATIVE EXAMPLE 2

384 g (2 mole) of trimellitic acid anhydride and 4 liter of NMP were charged into the same apparatus as Example 1 and the mixture was stirred at room temperature over a period of 1 hour without adding thionyl chloride as the first polymerization catalyst. 400 g(2 mole) of diaminodiphenyl ether and 204 g (2 mole) of triethylamine were dissolved in 3 liter of NMP and the solution was slowly added to the already prepared solution and then stirred at 70° C. over 3 hours. After heating to 100° C. and reacting over a period of 3 hours by adding 310 g (1 mole) of TPP, the procedure of Example 1 was followed. However, polymerization reaction never proceeded.

COMPARATIVE EXAMPLE 3

237.8 g (2 mole) of thionyl chloride was dissolved in 1 liter of NMP in the same apparatus as Example 1 and the solution was cooled to 0° C. to 5° C. After about 30 minutes, the temperature was heated to room temperature and maintained at the same temperature for 30 minutes. To the solution were slowly added 384 g (2 mole) of trimellitic acid anhydride and 400 cc of NMP. After stirring at room temperature over a period of 0.5 to 1 hour or so, 400 g(2 mole) of diaminodiphenyl ether and 20.4 g (2 mole) of triethylamine were added so that the concentration of reactants was 35% by weight to allow the reaction at 70° C. over a period of 4 hours. At this point the intrinsic viscosity of the sample taken out from the reaction mixture as measured on a solution of dimethylacetamide at a concentration of 0.5 g/dL at 30° C. was 0.23 dL/g. After 310 g (1 mole) of TPP was added and the temperature was raised to 100° C., polymerization reaction was carried out. However, gelation of the reaction mixture occurred.

COMPARATIVE EXAMPLE 4

The procedure of Example 1 was followed by using 474 g (4 mole) of thionyl choride as the first polymerization catalyst in the same reaction apparatus as disclosed in Example 1, but polymerization reaction never proceeded.

COMPARATIVE EXAMPLE 5

The procedur of Example 1 was followed by using 332 g (2 mole) of isophthalic acid in place of trimellitic acid in the same manner as disclosed in Example 1, but polymerization reaction never proceeded.

Table 1 below shows the polymerization condition and general physical properties of the PAI resins prepared in the Examples.

TABLE 1

| | Polymerization Conditions | | | | | Properties | | |
|---|---|---|---|---|---|---|---|---|
| | Thionyl chloride (mole) | Trimellitic acid anhydride (mole) | Diamine (mole) | reactant con. (% by weight) | Triphenyl Phosphite (mole percent) | Intrinsic visosity (dL/g) | Tg (°C.) | Tensile strength (kg/cm$^2$) |
| Ex. No. | | | | | | | | |
| 1 | 2 | 2 | ODA 2 | 9.8 | 50 | 0.93 | 280 | 1265 |
| 2 | 2 | 2 | ODA 2 | 9.8 | 25 | 0.85 | 280 | 1265 |
| 3 | 2 | 2 | ODA 2 | 9.8 | 12.5 | 0.65 | 279 | 1240 |
| 4 | 2 | 2 | ODA 2 | 9.8 | 6.25 | 0.51 | 280 | 1185 |
| 5 | 2 | 2 | ODA 2 | 7.7 | 50 | 0.64 | 296 | 1230 |
| 6 | 2 | 2 | ODA 2 | 9.4 | 50 | 0.86 | 285 | 1195 |
| 7 | 2 | 2 | ODA MPDA | 9.2 | 50 | 1.25 | 290 | 1278 |
| 8 | 2 | 2 | ODA MPDA HMDA 2 | 9.0 | 50 | 1.05 | 255 | 1180 |
| Comp. Ex. No. | | | | | | | | |
| 1 | 2 | 2 | ODA 2 | 9.8 | — | 0.25 | — | — |
| 2 | 2 | 2 | ODA 2 | 9.8 | 50 | — | — | — |
| 3 | 2 | 2 | ODA 2 | 35 | 50 | gelation | — | — |
| 4 | 2 | 2 | ODA 2 | 9.8 | 50 | — | — | — |
| 5 | 2 | IPA 2 | ODA 2 | 9.8 | 50 | — | — | — |

As seen from Table 1, The PAI resins according to the present invention were polymers having high molecular weights with an intrinsic viscosity of 0.5 dL/g or more. The tensile strengths of the resins measured in a film state were in a range of 1,000 to 1,300 kg/cm$^2$, which showed considerably good mechanical strength. In order to determine the thermal properties of the PAI resins according to the present invention, glass transition temperatures were measured by a Differential Scanning Calorimeter (DSC).

What is claimed is:

1. A process for preparing polyamideimide resins having an intrinsic viscosity of 0.4 to 1.50 dl/g as measured on a solution of dimethylacetamide as a solvent at a concentration of 0.5g/dl at 30° C., which comprises reacting an aromatic tricarboxylic acid anhydride with an aromatic diamine in N-methyl pyrrolidone solvent in the presence of a first catalyst selected from the group consisting of thionyl chloride, p-toluenesulphonyl chloride, sulfuryl chloride, cyanuric chloride and phosphorus trichloride at a temperature of 50° C. to 130° C. over a period of 1 to 5 hours and further reacting the resultant reaction mixture in the presence of a second catalyst which is a compound of the formula $(RO)_3P$ wherein R is an aliphatic or aromatic substituent, or a compound which is phosphoric acid, pyrophosphoric acid, phosphorous pentaoxide or phosphorous pentachloride as a second catalyst at a temperature of 50° C. to 130° C. over a period of 1 to 5 hours.

2. A process according to claim 1, wherein the second catalyst is selected from the group consisting of triphenyl phosphite, tricresyl phosphite, tricyclohexyl phosphite and dimethyl m-chlorophenyl phosphite.

3. A process according to claim 1, wherein the second catalyst is triphenyl phosphite.

4. A process according to claim 2, wherein the second catalyst is triphenyl phosphite.

5. A polyamideimide resin prepared by the process according to claim 1.

6. A polyamideimide resin prepared by the process according to claim 2.

7. A polyamideimide resin prepared by the process according to claim 3.

8. A polyamideimide resin prepared by the process according to claim 4.

* * * * *